US010436522B2

(12) United States Patent
Altman et al.

(10) Patent No.: US 10,436,522 B2
(45) Date of Patent: Oct. 8, 2019

(54) THERMAL STORAGE HEAT EXCHANGER STRUCTURES EMPLOYING PHASE CHANGE MATERIALS

(71) Applicant: Raytheon Company, Waltham, MA (US)

(72) Inventors: David Altman, Sudbury, MA (US); Nicholas Ian Maniscalco, Hunter, NY (US); Jonathan Balducci, Sterling, MA (US)

(73) Assignee: Raytheon Company, Waltham, MA (US)

( * ) Notice: Subject to any disclaimer, the term of this patent is extended or adjusted under 35 U.S.C. 154(b) by 195 days.

(21) Appl. No.: 15/225,582

(22) Filed: Aug. 1, 2016

(65) Prior Publication Data

US 2018/0031333 A1    Feb. 1, 2018

(51) Int. Cl.
*F28F 23/00*    (2006.01)
*F28F 21/08*    (2006.01)
(Continued)

(52) U.S. Cl.
CPC ............ *F28D 20/021* (2013.01); *F28D 15/00* (2013.01); *F28F 1/12* (2013.01); *F28F 3/025* (2013.01);
(Continued)

(58) Field of Classification Search
CPC ............. F28D 15/00; F28D 2020/0013; F28D 20/021; F28F 1/12; F28F 21/081;
(Continued)

(56) References Cited

U.S. PATENT DOCUMENTS 4,140,173 A * 2/1979 Wulf .................. B60H 1/20
165/10
4,294,078 A * 10/1981 MacCracken ......... F28D 20/021
126/618
(Continued)

FOREIGN PATENT DOCUMENTS

DE    2551911 A1    6/1977
JP    S58164955 A    9/1983
(Continued)

OTHER PUBLICATIONS

Hansen et al., "Water-Based Phase Change Material Heat Exchanger Development", 44th International Conference on Environmental Systems, Jul. 13-17, 2014, 7 pgs.
(Continued)

*Primary Examiner* — Henry T Crenshaw

(57) ABSTRACT

A heat exchanger includes a housing configured to contain a working fluid. The heat exchanger also includes a plurality of chambers disposed within the housing and arranged so as to be surrounded by the working fluid when the working fluid is within the housing, each chamber configured to contain a phase change material (PCM) that expands upon freezing. The walls of each chamber are formed of a high thermal conductivity material that allows transfer of thermal energy between the working fluid and the PCM in each chamber. The walls of each chamber include expandable bellows configured to deform to increase an internal volume of the chamber as the PCM expands upon freezing.

20 Claims, 3 Drawing Sheets

(51) Int. Cl.
  *F28F 3/02* (2006.01)
  *F28D 20/02* (2006.01)
  *F28D 15/00* (2006.01)
  *F28F 1/12* (2006.01)
  *F28D 20/00* (2006.01)

(52) U.S. Cl.
  CPC .......... *F28F 21/081* (2013.01); *F28F 21/083* (2013.01); *F28F 21/084* (2013.01); *F28F 21/086* (2013.01); *F28F 23/00* (2013.01); *F28D 2020/0013* (2013.01); *F28F 2255/02* (2013.01); *F28F 2265/14* (2013.01); *Y02E 60/145* (2013.01)

(58) Field of Classification Search
  CPC ...... F28F 21/083; F28F 21/084; F28F 21/086; F28F 2255/02; F28F 2265/14; F28F 23/00; F28F 3/025
  See application file for complete search history.

(56) References Cited

U.S. PATENT DOCUMENTS

| | | | |
|---|---|---|---|
| 5,497,629 A * | 3/1996 | Rafalovich | F24D 11/0214 62/199 |
| 5,944,089 A | 8/1999 | Roland | |
| 6,202,739 B1 | 3/2001 | Pal et al. | |
| 6,247,522 B1 * | 6/2001 | Kaplan | F25D 3/005 165/10 |
| 6,988,304 B2 | 1/2006 | Moseley et al. | |
| 7,014,151 B2 | 3/2006 | Klett et al. | |
| 7,859,845 B2 | 12/2010 | Ullman et al. | |
| 7,980,293 B2 | 7/2011 | Jensen | |
| 8,342,454 B1 | 1/2013 | Leimkuehler et al. | |
| 8,935,936 B2 | 1/2015 | Karl et al. | |
| 2009/0188658 A1 | 7/2009 | Petrenko et al. | |
| 2009/0211732 A1 * | 8/2009 | Goenka | B60H 1/00328 165/104.17 |
| 2010/0201241 A1 * | 8/2010 | Weaver | F21V 29/004 313/46 |
| 2011/0132576 A1 | 6/2011 | Bugby et al. | |
| 2013/0306287 A1 * | 11/2013 | Ryoo | F28D 1/047 165/181 |
| 2014/0008042 A1 | 1/2014 | Schryver et al. | |
| 2014/0284020 A1 | 9/2014 | Amir et al. | |
| 2015/0060017 A1 | 3/2015 | Chung et al. | |
| 2015/0113975 A1 * | 4/2015 | Riley | F03G 7/06 60/529 |
| 2015/0128445 A1 | 5/2015 | Dittrich et al. | |
| 2015/0143818 A1 | 5/2015 | Eckhoff et al. | |
| 2015/0144310 A1 | 5/2015 | Semmes | |
| 2016/0029515 A1 | 1/2016 | Tansley | |

FOREIGN PATENT DOCUMENTS

| | | |
|---|---|---|
| WO | 9516175 A1 | 6/1995 |
| WO | WO 95/16175 * | 6/1995 |
| WO | 0192129 A1 | 12/2001 |
| WO | 2011058383 A2 | 5/2011 |
| WO | 2012112055 A1 | 8/2012 |

OTHER PUBLICATIONS

Joshua D. Sole, "An Improved Phase Change Thermal Storage Device Using a Vibration Reducing Pre-Compression Elastomer and Method for Fabrication Thereof", U.S. Appl. No. 14/970,914, filed Dec. 16, 2015, 21 pgs.
International Search Report and Written Opinion of the International Searching Authority for PCT Application No. PCT/US2017/044486 dated Nov. 8, 2017; 13 pages.
International Search Report and Written Opinion of the International Searching Authority for PCT Application No. PCT/S2017/044500 dated Nov. 10, 2017; 14 pages.

* cited by examiner

THERMAL STORAGE HEAT EXCHANGER STRUCTURES EMPLOYING PHASE CHANGE MATERIALS

TECHNICAL FIELD

This disclosure is directed in general to thermal storage heat exchangers. More specifically, this disclosure relates to thermal storage heat exchanger structures that employ ice/water as a phase change material.

BACKGROUND

Heat exchangers have a wide variety of applications in systems where thermal energy (often simply referred to as "heat") must be moved from one location to another. Similarly, thermal energy storage (TES) heat exchangers are widely used to temporarily store excess thermal energy and later release the energy. This has the benefit of thermal "load leveling" (duty cycle averaging), reducing the thermal load that must be dissipated. In many TES heat exchangers, a phase change material (PCM), such as paraffin, is used as the thermal storage material in the heat exchanger due to its stability and high thermal storage capacity.

SUMMARY

This disclosure provides a system and method using a thermal storage heat exchanger structure that employs a phase change material (PCM) that expands upon freezing, such as ice/water.

In a first embodiment, a heat exchanger includes a housing configured to contain a working fluid. The heat exchanger also includes a plurality of chambers disposed within the housing and arranged so as to be surrounded by the working fluid when the working fluid is within the housing, each chamber configured to contain a phase change material (PCM) that expands upon freezing. The walls of each chamber are formed of a high thermal conductivity material that allows transport of thermal energy between the working fluid and the PCM in each chamber. The walls of each chamber include expandable bellows configured to deform to increase an internal volume of the chamber as the PCM expands upon freezing.

In a second embodiment, a system includes at least one heat source, at least one heat sink, and a heat exchanger configured to receive thermal energy from the at least one heat source and provide thermal energy to the at least one heat sink. The heat exchanger includes a housing configured to contain a working fluid. The heat exchanger also includes a plurality of chambers disposed within the housing and arranged so as to be surrounded by the working fluid when the working fluid is within the housing, each chamber configured to contain a PCM that expands upon freezing. The walls of each chamber are formed of a high thermal conductivity material that allows transport of thermal energy between the working fluid and the PCM in each chamber. The walls of each chamber include expandable bellows configured to deform to increase an internal volume of the chamber as the PCM expands upon freezing.

In a third embodiment, a method includes moving a working fluid through a housing of a heat exchanger, the housing containing a plurality of chambers, each chamber containing a PCM that expands upon freezing. The method also includes transferring thermal energy from the PCM to the working fluid as the working fluid moves around each of the plurality of chambers. The walls of each chamber are formed of a high thermal conductivity material that allows transport of thermal energy between the working fluid and the PCM in each chamber. The walls of each chamber include expandable bellows configured to deform to increase an internal volume of the chamber as the PCM expands upon freezing.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
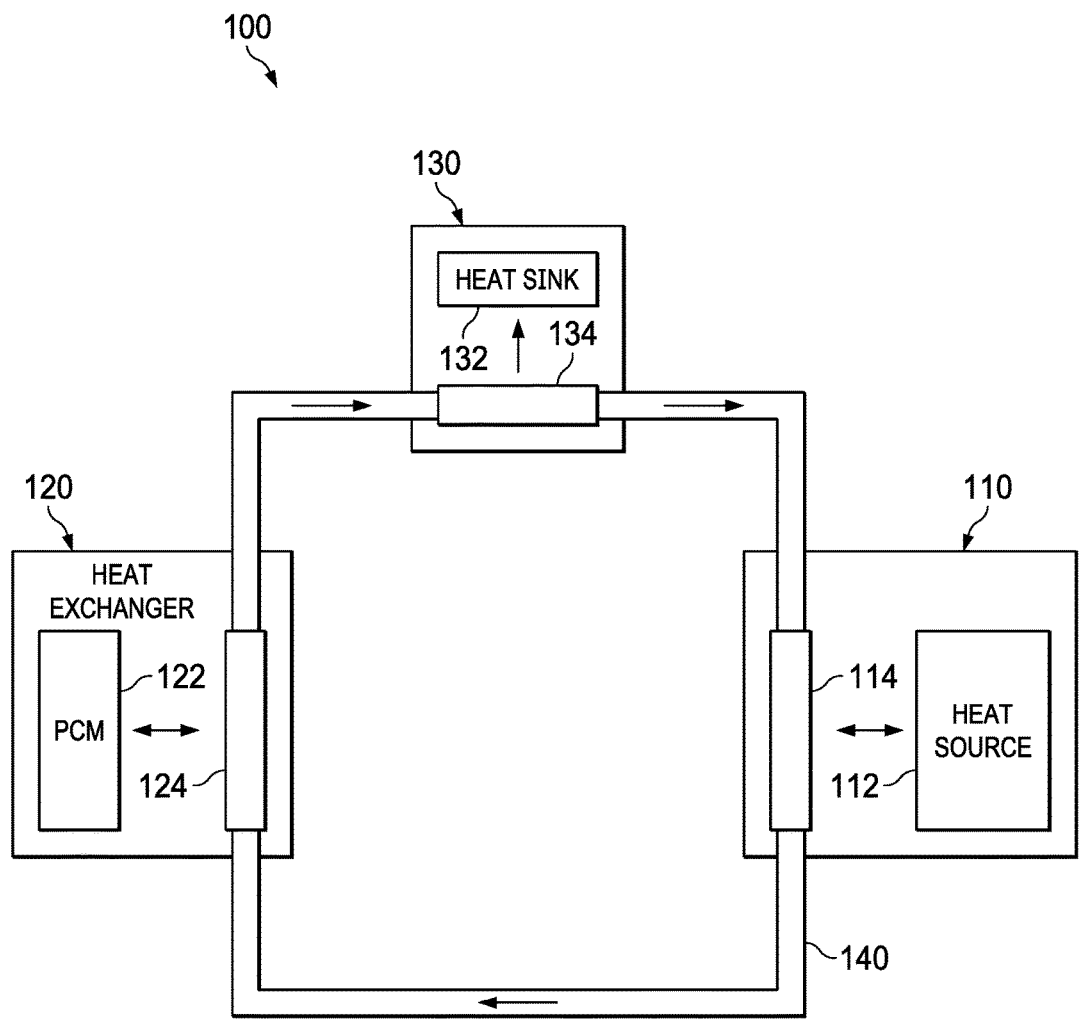
FIG. 1 illustrates an example thermal management system in which a phase change material (PCM) heat exchanger can be used according to this disclosure.

FIGS. 1 through 4, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Existing thermal storage heat exchangers generally use various paraffins as the latent thermal storage material. Paraffin waxes are stable, chemically benign and exhibit repeatable melting and solidification behaviors; however, their thermal conductivity requires a large quantity of heat spreading structure in the PCM heat exchanger to enable heat transfer into and out of the PCM. Paraffins also have relatively low densities and therefore require a larger volume of material relative to other known organic and inorganic PCMs. In general, paraffin-based PCM heat exchangers are limited to a specific and volumetric energy density of approximately 50-70 kJ/kg and 50-70 MJ/m$^3$, respectively. These numbers are unacceptably low for certain applications in which weight and volume allocations are limited, for example, emerging directed energy applications.

To address the thermal limitations of paraffins, some heat exchanger systems have proposed the use of ice/water as a PCM. The benefits of using ice/water as a PCM arise from its favorable thermo-physical properties (e.g., high latent heat of fusion, density, and thermal conductivity). Ice/water is also particularly advantageous for systems that will require refrigeration or have access to very low temperature heat sinking environments. However, ice/water is also unique (relative to most other known PCMs) in that water expands upon freezing. An ice/water PCM heat exchanger must be designed to accommodate this expansion while maintaining effective heat transfer through intimate contact with heat exchanger enveloping and heat spreading structures. Typical plate/fin PCM heat exchanger designs that are effective with common PCMs (such as paraffins) feature rigid enclosures and are not suitable for an ice/water PCM, as the walls of the enclosures would be ruptured by freezing.

Some designs in which use ice/water is used as a PCM have shown potential in heat sink (as opposed to heat exchanger) applications. However, these designs are not suitable for TES PCM heat exchangers where a high heat transfer rate (e.g., hundreds of kilowatts) from/to a liquid working fluid is required, as is the case for many military directed energy applications. This is due to the designed structure, system configuration, and relatively high conductive thermal resistance associated with transferring heat into and out of the ice/water PCM. Similarly, other ice/water PCM heat exchanger structure designs feature high convective and conductive thermal resistances associated with getting heat into and out of the ice/water PCM. While these designs can be suitable in a low rate transfer (tens of kW), relatively small energy (e.g., 5 MJ) applications, such designs are not acceptable in a high rate (e.g., >100 kW), high energy (e.g., ~25 MJ) application, which may be required in directed energy applications.

To address these or other issues, embodiments of this disclosure provide a thermal energy storage (TES) heat exchanger that employs ice/water as a phase change material (PCM) and is not subject to rupture due to the volumetric expansion of ice as it freezes. The disclosed embodiments significantly improve the specific and volumetric energy density of PCM TES heat exchangers, thereby reducing the size and weight of thermal management systems (TMS) that employ load leveling via thermal energy storage.

It will be understood that embodiments of this disclosure may include any one, more than one, or all of the features described here. In addition, embodiments of this disclosure may additionally or alternatively include other features not listed here.

FIG. 1 illustrates an example thermal management system 100 in which a PCM heat exchanger can be used according to this disclosure. The embodiment of the system 100 shown in FIG. 1 is for illustration only. Other embodiments of the system 100 could be used without departing from the scope of this disclosure. Those skilled in the art will recognize that, for simplicity and clarity, some features and components are not explicitly shown in every figure, including those illustrated in connection with other figures. Such features, including those illustrated in other figures, will be understood to be equally applicable to the system 100. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figure.

As shown in FIG. 1, the system 100 includes a heat source component 110, a heat exchanger 120, and a heat sink component 130. The heat source component 110 houses a heat source 112 and a conduit 114. The heat source 112 generates high levels of thermal energy during use, either continually or in short bursts. The heat source 112 may be any of a variety of heat generating sources, including, but not limited to, electronic components, lasers, and the like. Because the heat source 112 can vary greatly, the details of heat source 112 are not illustrated and described. Similarly, the heat source component 110 housing the heat source 112 can vary greatly and can represent any suitable structure in which the heat source 112 is located. In some embodiments, the heat source component 110 may represent a compartment of a land, sea, air, or space vehicle. While FIG. 1 shows one heat source component 110 and one heat source 112 for simplicity, in some embodiments, there can be multiple heat source components 110 and/or multiple heat sources 112.

The conduit 114 carries a working fluid through the heat source component 110 in proximity to the heat source 112. During operation of the system 100, the working fluid passing through the conduit 114 exchanges thermal energy with the heat source 112 through convection and conduction. The working fluid can be any fluid that is suitable for use in a thermal management system. In some embodiments, the working fluid is a mixture of ethylene glycol and water. While a single conduit 114 is shown in FIG. 1, the conduit 114 may actually represent multiple conduits that carry working fluid in parallel, in a mesh pattern, or in any other suitable configuration. In one particular aspect of operation, the heat source 112 generates short bursts of thermal energy and the working fluid in the conduit 114 cools the heat source 112 by absorbing thermal energy that is transferred from the heat source 112 to the conduit 114. In another aspect of operation, the heat source 112 may be in an idle mode or another non-heat-generating mode, and the working fluid in the conduit 114 may transfer thermal energy back to the heat source 112 through the conduit 114.

The heat sink component(s) 130 includes a heat sink 132 and a conduit 134. The heat sink 132 can represent a heat sink for a final transfer of thermal energy out of the system 100. In some embodiments, the heat sink 132 may be the atmosphere, a large body of water, or another suitable heat sink medium, which may be gas, liquid, or a two-phase fluid. Because the heat sink 132 can vary greatly, the details of heat sink 132 are not illustrated and described. Similarly, the heat sink component 130 that includes the heat sink 132 can vary greatly and can represent any suitable location or structure in which the heat sink 132 is located. While FIG. 1 shows one heat sink component 130 and one heat sink 132 for simplicity, in some embodiments, there can be multiple heat sink components 130 and/or multiple heat sinks 132.

The conduit 134 carries a working fluid through the heat sink component 130 in proximity to the heat sink 132. During operation of the system 100, the working fluid passing through the conduit 134 transfers thermal energy to the heat sink 132 through convection and conduction. The working fluid can be any fluid that is suitable for use in a thermal management system. In some embodiments, the working fluid is a mixture of ethylene glycol and water. While a single conduit 134 is shown in FIG. 1, the conduit 134 may actually represent multiple conduits that carry working fluid in parallel, in a mesh pattern, or in any other suitable configuration.

The heat exchanger 120 is a thermal energy storage (TES) phase change material (PCM) heat exchanger that uses a PCM (such as ice/water) as a thermal energy storage material. The heat exchanger 120 includes a PCM chamber 122 and a conduit 124. The heat exchanger 120 is thermally coupled with the heat source component 110 and the heat sink component 130 via a working fluid loop 140 that includes the conduits 114, 124, 134. That is, thermal energy can be transported between the heat source component 110, the heat exchanger 120, and the heat sink component 130 by the working fluid that passes through the loop 140.

The PCM chamber 122 holds the PCM. The conduit 124 carries the working fluid through the heat exchanger 120 in proximity to the PCM chamber 122. During operation of the system 100, the working fluid passing through the conduit 124 exchanges thermal energy with the PCM chamber 122 through convection and conduction. While a single PCM chamber 122 is shown in FIG. 1, most PCM heat exchangers include multiple PCM chambers, and the PCM chamber 122 may represent any suitable number of PCM chambers in the heat exchanger 120. Similarly, the conduit 124 may actually represent multiple conduits that carry working fluid in parallel, in a mesh pattern, or in any other suitable configuration.

In one aspect of operation, thermal energy generated by the heat source 112 is transferred to the working fluid in the conduit 114. The working fluid carries the thermal energy through the loop 140 to the conduit 124 in the heat exchanger 120. In the heat exchanger 120, at least some of the thermal energy is transferred from the working fluid in the conduit 124 to the PCM in the PCM chamber 122 through convection and conduction. The PCM in the heat exchanger 120 is capable of storing the thermal energy until it can be released back to the working fluid in the conduit 124 by transfer of thermal energy in the opposite direction. At such time, thermal energy is transferred from the PCM in the PCM chamber 122 to the working fluid in the conduit 124. The working fluid carries the thermal energy through the loop 140 to the conduit 134 in the heat sink component 130. In the heat sink component 130, at least some of the thermal energy is transferred from the working fluid in the conduit 134 to the heat sink 132.

In accordance with this disclosure, the PCM in the heat exchanger 120 is ice/water. When thermal energy is transferred from the conduit 124 to the PCM chamber 122, the PCM changes from ice to water as the PCM absorbs the thermal energy. Similarly, the PCM changes from water to ice and releases thermal energy when thermal energy is transferred from the PCM chamber 122 back to the conduit 124. The heat exchanger 120 includes a number of advantageous features to accommodate the volumetric expansion of ice as it freezes, as described in greater detail below.

Although FIG. 1 illustrates one example of a thermal management system 100 in which a PCM heat exchanger can be used, various changes may be made to FIG. 1. For example, while the heat source component 110, heat exchanger 120, and heat sink component 130 are shown as separated, this is merely for clarity of illustration. In some embodiments, two or more of the components 110, 120, 130 could be in contact with each other, or two or more of the components 110, 120, 130 could be part of the same structure. Also, the makeup and arrangement of the system 100 are for illustration only. Components could be added, omitted, combined, or placed in any other configuration according to particular needs.

Figure 2:
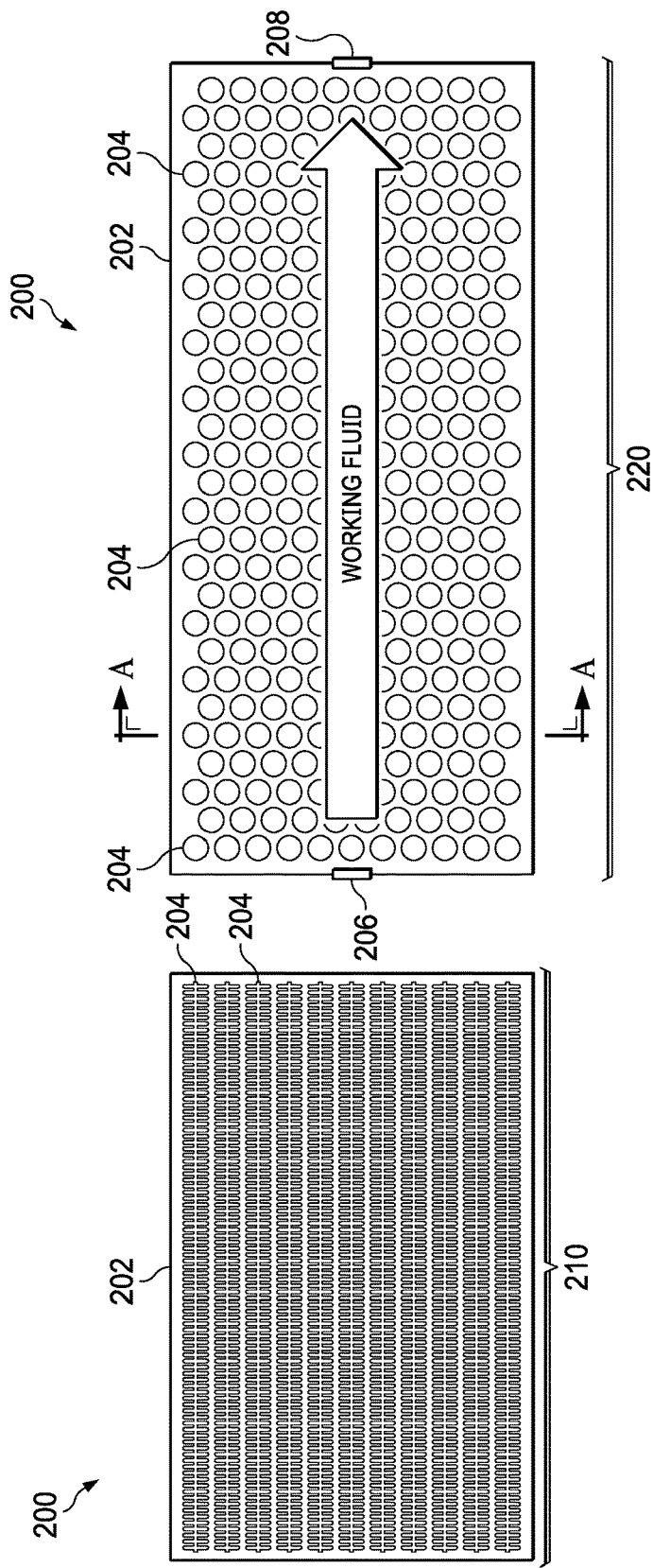
FIG. 2 illustrates a PCM heat exchanger according to this disclosure.

FIG. 2 illustrates a PCM heat exchanger 200 according to this disclosure. The PCM heat exchanger 200 can represent (or be represented by) the heat exchanger 120 of FIG. 1. The embodiment of the PCM heat exchanger 200 shown in FIG. 2 is for illustration only. Other embodiments of the PCM heat exchanger 200 can be used without departing from the scope of this disclosure.

The PCM heat exchanger 200 is a thermal energy storage (TES) heat exchanger and includes some features similar to those found in a shell and tube PCM heat exchanger architecture. Typical shell and tube heat exchangers include a "shell" or housing, such a pressure vessel, that encases multiple tubes. One fluid is inside each of the tubes and a second fluid flows through the shell around and between the tubes. Unlike existing shell and tube PCM heat exchangers, which cannot use ice/water as a PCM without rupture, the PCM heat exchanger 200 includes features that permit the use of ice/water as a PCM thermal storage material.

FIG. 2 shows two views 210-220 of the heat exchanger 200. The view 210 is a cross-sectional view of the heat exchanger 200 taken along the line A-A in the view 220. The heat exchanger 200 includes a housing 202 that surrounds a plurality of flexible, expandable PCM chambers 204. The heat exchanger 200 also includes an inlet 206 and an outlet 208. In one embodiment, the housing 202 is a generally rectangular structure having dimensions approximately 1 foot by 1 foot by 2 feet. The housing 202 can be closed and sealed to be airtight and watertight except for the inlet 206 and the outlet 208. The walls of the housing 202 can be thermally insulated from the surrounding environment in order to minimize transfer of thermal energy through the walls.

The inlet 206 of the heat exchanger 200 is an opening in the housing 202 through which a working fluid enters the heat exchanger 200. Similarly, the outlet 208 is an opening in the housing 202 through which the working fluid exits the heat exchanger 200. The inlet 206 and outlet 208 are coupled to a thermal management working fluid loop, such as the loop 130 of FIG. 1. The working fluid enters the heat exchanger 200 at the inlet 206, passes throughout the interior cavity of the housing 202 through the gaps between adjacent PCM chambers 204, and then exits the heat exchanger 200 at the outlet 208, where the working fluid moves to additional portions of the loop. This is represented by the large arrow shown in FIG. 2. Thus, the interior cavity of the housing 202 itself acts as a conduit for the working fluid, similar to the conduit 124 in FIG. 1. The working fluid can be any fluid that is suitable for use in a thermal management system. In some embodiments, the working fluid is a mixture of ethylene glycol and water.

Inside the housing 202, the PCM chambers 204 are substantially identical and are arranged in a staggered grid, such as shown in FIG. 2, or in another ordered arrangement. The PCM chambers 204 are spaced apart from each other such that there is a gap or space between adjacent PCM chambers 204. In some embodiments, the spacing between adjacent PCM chambers 204 may be approximately 5% of the diameter of the PCM chamber 204. The PCM chambers 204 are closed reservoirs that are filled with ice/water, which is the PCM material for the PCM heat exchanger 200. The water in each PCM chamber 204 is generally filtered water, without any additives. In some embodiments, the water may be demineralized water; however, there is no requirement that the water be absolutely pure. The walls of each PCM chamber 204 can be a metal, such as stainless steel, aluminum, titanium, copper, Inconel, or any other suitable material that has advantageous heat transfer properties (e.g., high thermal conductivity).

Figure 3:
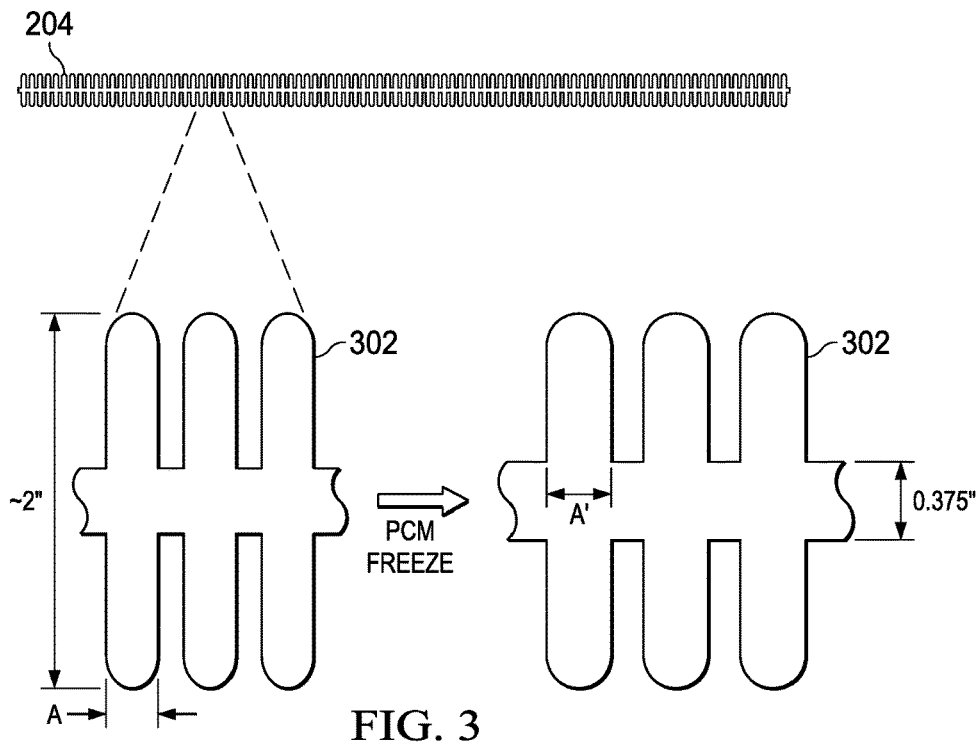
FIG. 3 illustrates magnified views of the PCM heat exchanger of FIG. 2.

In some embodiments, each PCM chamber 204 is elongate, being approximately one foot in length and approximately two inches in diameter at its largest cross section. FIG. 3 illustrates magnified views of one PCM chamber 204. The walls of each PCM chamber 204 are formed as a row of multiple flexible corrugated metal bellows 302 that provide mechanical compliance for the expansion of the PCM. The bellows 302 serve as PCM-filled fins that have extended surfaces, providing substantially greater surface area for the PCM chamber 204 than if the PCM chamber 204 were simply cylindrical with straight walls. The increased surface area results in increased convective heat transfer area, and reduces the conduction length associated with transferring thermal energy into and out of the PCM.

The bellows 302 also accommodate the expansion of the PCM when it freezes. As shown in FIG. 3, dimension A represents the thickness of each bellow 302 when the PCM is in liquid state (e.g., water). When the PCM freezes and expands, one or more of the bellows 302 expands in thickness to the dimension A'. That is, the corrugated walls of the bellows 302 deform, resulting in a larger dimension A' to accommodate the expanded PCM. In some embodiments, dimension A is approximately 0.20 inches and A' is approximately 0.22 inches. Of course, this is merely one example. In other embodiments, the dimensions A and A' could be larger or smaller according to particular needs. The structure of each PCM chamber 204 advantageously utilizes the flexible bellows 302 to simultaneously accommodate expansion, reduce the conduction length into the ice/water and increase convective heat transfer through the addition of the extended surfaces provided by the corrugations of the bellows 302. The shape of the bellows 302 may vary from embodiment to embodiment, so long as the shape is appropriate for accommodating the expansion of the PCM.

In one aspect of operation, the PCM material in the PCM chambers 204 is in a liquid water state. Thermal energy from the PCM chambers 204 is transferred through the walls of the PCM chambers 204 to the working fluid through convection and conduction. As the thermal energy is transported from the PCM, the water freezes into ice and expands as it does so. As the ice forms and expands, the bellows 302 expand as shown in FIG. 3 to provide additional volume inside each PCM chamber 204 for the expanding ice, thereby avoiding a rupture of any PCM chamber walls. Later, when thermal energy is transferred from the working fluid to the PCM in each PCM chamber 204, the ice melts into water and contracts, and the bellows 302 return to their static shape due the pressure difference between the interior and exterior of the PCM chamber 204. Certain configurations of the bellows 302 also promote directional freezing of ice in each of the PCM chambers 204, which improves the operation of the PCM chamber 204 by encouraging the formation of ice within the PCM chamber 204 in the vicinity of each bellow 302.

Although FIGS. 2 and 3 illustrate one example of a PCM heat exchanger 200, various changes may be made to FIGS. 2 and 3. For example, while shown as having bellows 302 along its entire length, one or more of the PCM chambers 204 could have one or more flat, uncorrugated sections along a portion of its length. Also, while certain dimensions have been provided as an example, such dimensions could be larger or smaller according to particular needs. In addition, the makeup and arrangement of the PCM heat exchanger 200 are for illustration only. Components could be added, omitted, combined, or placed in any other configuration according to particular needs. For example, while the housing 202 is shown as substantially filled with PCM chambers 204, this is merely one example. In other embodiments, portions of the housing 202 may include few or more PCM chambers 204, or the PCM chambers 204 may be spaced further apart in portions.

Figure 4:
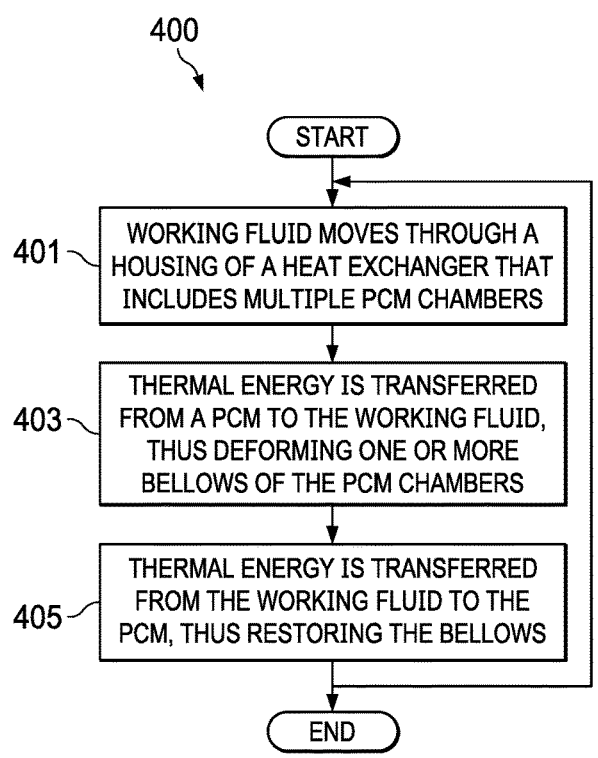
FIG. 4 illustrates an example method for using a PCM heat exchanger according to this disclosure.

FIG. 4 illustrates an example method 400 for using a PCM heat exchanger according to this disclosure. The method 400 may be performed using the PCM heat exchanger 200 of FIG. 2 in the thermal management system 100 of FIG. 1. However, the method 400 could be used with any other suitable system.

At step 401, a working fluid moves through a housing of a heat exchanger. For example, a pump in a thermal management system may pump the working fluid through the housing. The housing contains a plurality of chambers, and each chamber contains a PCM that expands upon freezing, such as ice/water. This may include, for example, a working heat transfer fluid such as ethylene glycol and water moving through the housing 202.

At step 403, thermal energy is transferred from a PCM to the working fluid as the working fluid moves around each of the plurality of chambers. This may include, for example, thermal energy transferring from the PCM in each of the PCM chambers 204 to the working fluid as the working fluid moves around each PCM chamber 204 in the housing 202. At least some of the thermal energy may represent excess thermal energy that can be transported to a heat sink, such as the heat sink 132.

The walls of each chamber are formed of a high thermal conductivity material that allows transfer of thermal energy between the working fluid and the PCM in each chamber. Also, the walls of each chamber include expandable bellows configured to deform to increase a volume of the chamber as the PCM expands upon freezing. For example, each PCM chamber 204 includes a plurality of bellows 302 that can deform to expand the overall volume inside each chamber. As thermal energy transfers from the PCM to the working fluid, the PCM freezes and expands. As the PCM expands, the bellows 302 deform to increase the volume of the PCM chamber 204.

At step 405, thermal energy is transferred from the working fluid to the PCM. This may include, for example, thermal energy transferring from the working fluid to the PCM in each PCM chamber 204. At least some of the thermal energy may represent thermal energy generated at a heat source, such as the heat source 112. As thermal energy transfers from the working fluid to the PCM, the PCM melts and contracts. As the PCM contracts, the bellows 302 of each PCM chamber 204 return to their static condition, thereby decreasing the volume of each PCM chamber 204.

In some embodiments, the working fluid is in a working fluid loop in a thermal management system, and the steps 401-405 can be repeated one or more times in the thermal management system.

Although FIG. 4 illustrates one example of a method 400 for using a PCM heat exchanger, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system"

within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A heat exchanger comprising:
    a housing configured to contain a working fluid; and
    a plurality of chambers disposed within the housing and arranged so as to be surrounded by the working fluid when the working fluid is within the housing, each chamber configured to contain a phase change material (PCM) that expands upon freezing,
    wherein walls of each chamber are formed of a high thermal conductivity material that allows transport of thermal energy between the working fluid and the PCM in each chamber,
    wherein the walls of each chamber include expandable bellows configured to deform to increase an internal volume of the chamber as the PCM expands upon freezing, the bellows extending radially outward from a center portion of the chamber that connects the bellows, each of the bellows having first and second planar wall portions that extend radially outward from the center portion and are connected by a curved end wall portion at an outer edge of the bellow, wherein a diameter of the center portion is less than half a diameter of the chamber at the outer edges of the bellows, wherein a dimension of the first and second planar wall portions from the center portion to the curved end wall portion is greater than the diameter of the center portion, and wherein a first volume of the PCM within each of the bellows and inside the diameter of the center portion is less than a second volume of the PCM within the bellow and outside the diameter of the center portion.

2. The heat exchanger of claim 1, wherein the plurality of chambers are spaced apart inside the housing with a space between adjacent chambers, the spaces connected to allow the working fluid to flow throughout the housing and around each chamber.

3. The heat exchanger of claim 1, wherein the bellows are arranged in a row to form corrugated walls of each chamber.

4. The heat exchanger of claim 1, wherein the PCM comprises ice/water.

5. The heat exchanger of claim 1, wherein the walls of each chamber are formed of at least one of: stainless steel, aluminum, titanium, copper, or Inconel.

6. The heat exchanger of claim 1, wherein the working fluid comprises a mixture of ethylene glycol and water.

7. The heat exchanger of claim 1, further comprising:
    an inlet in a first wall of the housing, the inlet configured to receive the working fluid into the heat exchanger; and
    an outlet in a second wall of the housing, the outlet configured to allow the working fluid to exit the heat exchanger,
    wherein the inlet and the outlet are coupled to a working fluid loop in a thermal energy management system.

8. A system comprising:
    at least one heat source;
    at least one heat sink; and
    a heat exchanger configured to receive thermal energy from the at least one heat source and provide the thermal energy to the at least one heat sink, the heat exchanger comprising:
        a housing configured to contain a working fluid; and
        a plurality of chambers disposed within the housing and arranged so as to be surrounded by the working fluid when the working fluid is within the housing, each chamber configured to contain a phase change material (PCM) that expands upon freezing,
        wherein walls of each chamber are formed of a high thermal conductivity material that allows transport of thermal energy between the working fluid and the PCM in each chamber,
        wherein the walls of each chamber include expandable bellows configured to deform to increase an internal volume of the chamber as the PCM expands upon freezing, the bellows extending radially outward from a center portion of the chamber that connects the bellows, each of the bellows having first and second planar wall portions that extend radially outward from the center portion and are connected by a curved end wall portion at an outer edges of the bellow,
        wherein a diameter of the center portion is less than half a diameter of the chamber at the outer edge of the bellows,
        wherein a dimension of the first and second planar wall portions from the center portion to the curved end wall portion is greater than the diameter of the center portion, and
        wherein a first volume of the PCM within each of the bellows and inside the diameter of the center portion is less than a second volume of the PCM within the bellow and outside the diameter of the center portion.

9. The system of claim 8, wherein the plurality of chambers are spaced apart inside the housing with a space between adjacent chambers, the spaces connected to allow the working fluid to flow throughout the housing and around each chamber.

10. The system of claim 8, wherein the bellows are arranged in a row to form corrugated walls of each chamber.

11. The system of claim 8, wherein the PCM comprises ice/water.

12. The system of claim 8, wherein the walls of each chamber are formed of at least one of: stainless steel, aluminum, titanium, copper, or Inconel.

13. The system of claim 8, wherein the working fluid comprises a mixture of ethylene glycol and water.

14. The system of claim 8, wherein the heat exchanger further comprises:
    an inlet in a first wall of the housing, the inlet configured to receive the working fluid into the heat exchanger; and
    an outlet in a second wall of the housing, the outlet configured to allow the working fluid to exit the heat exchanger,
    wherein the inlet and the outlet are coupled to a working fluid loop that is also coupled to the at least one heat source of the system.

15. The system of claim 8, wherein the system is disposed in a land, sea, air, or space vehicle.

16. A method comprising:
moving a working fluid through a housing of a heat exchanger, the housing containing a plurality of chambers, each chamber containing a phase change material (PCM) that expands upon freezing; and
transferring thermal energy between the PCM and the working fluid as the working fluid moves around each of the plurality of chambers,
wherein walls of each chamber are formed of a high thermal conductivity material that allows transport of thermal energy between the working fluid and the PCM in each chamber,
wherein the walls of each chamber include expandable bellows configured to deform to increase an internal volume of the chamber as the PCM expands upon freezing, the bellows extending radially outward from a center portion of the chamber that connects the bellows, each of the bellows having first and second planar wall portions that extend radially outward from the center portion and are connected by a curved end wall portion at an outer edge of the bellow,
wherein a diameter of the center portion is less than half a diameter of the chamber at the outer edges of the bellows,
wherein a dimension of the first and second planar wall portions from the center portion to the curved end wall portion is greater than the diameter of the center portion, and
wherein a first volume of the PCM within each of the bellows and inside the diameter of the center portion is less than a second volume of the PCM within the bellow and outside the diameter of the center portion.

17. The method of claim 16, wherein the plurality of chambers are spaced apart inside the housing with a space between adjacent chambers, the spaces connected to allow the working fluid to flow throughout the housing and around each chamber.

18. The method of claim 16, wherein the bellows are arranged in a row to form corrugated walls of each chamber.

19. The method of claim 16, wherein the PCM comprises ice/water.

20. The method of claim 16, wherein the walls of each chamber are formed of at least one of: stainless steel, aluminum, titanium, copper, or Inconel.

* * * * *